United States Patent
Witte et al.

(10) Patent No.: US 10,776,967 B2
(45) Date of Patent: Sep. 15, 2020

(54) RASTER LOG DIGITIZATION SYSTEM AND METHOD

(71) Applicant: Drilling Info, Inc., Austin, TX (US)

(72) Inventors: Dean Witte, Littleton, CO (US); Isaac Witte, Austin, TX (US); Ran Xuan, Austin, TX (US)

(73) Assignee: Drilling Info, Inc., Austin, TX (US)

( * ) Notice: Subject to any disclaimer, the term of this patent is extended or adjusted under 35 U.S.C. 154(b) by 11 days.

(21) Appl. No.: 15/910,909

(22) Filed: Mar. 2, 2018

(65) Prior Publication Data

US 2018/0253873 A1 Sep. 6, 2018

Related U.S. Application Data

(63) Continuation of application No. 14/958,879, filed on Dec. 3, 2015, now Pat. No. 9,911,210.

(60) Provisional application No. 62/087,109, filed on Dec. 3, 2014.

(51) Int. Cl.
*G06T 11/20* (2006.01)
(52) U.S. Cl.
CPC .......... *G06T 11/206* (2013.01); *G06T 11/203* (2013.01)
(58) Field of Classification Search
CPC .... G06T 11/206; G06F 3/0481; G06F 17/246; H04L 12/2458; G06Q 10/10
See application file for complete search history.

(56) References Cited

U.S. PATENT DOCUMENTS

| | | | |
|---|---|---|---|
| 4,633,400 A | 12/1986 | Chittineni | |
| 5,056,066 A | 10/1991 | Howard | |
| 5,835,882 A | 11/1998 | Vienot et al. | |
| 5,987,388 A | 11/1999 | Crawford | |
| 6,223,126 B1 | 4/2001 | Neff et al. | |
| 6,295,504 B1 | 9/2001 | Ye et al. | |
| 6,965,383 B2 | 11/2005 | Ritter | |
| 7,054,753 B1 | 5/2006 | Williams et al. | |
| 7,069,149 B2 | 6/2006 | Goff | |
| 7,516,055 B2 | 4/2009 | Strebelle et al. | |
| 7,525,349 B2 | 4/2009 | Mavoori et al. | |
| 8,265,876 B1 | 9/2012 | Yu et al. | |
| 8,826,879 B2 | 9/2014 | Lee | |
| 9,182,511 B2 | 11/2015 | Neave | |
| 9,618,639 B2 | 4/2017 | Witte et al. | |
| 9,911,210 B1 * | 3/2018 | Witte | G06T 11/203 |

(Continued)

OTHER PUBLICATIONS

Admasu et al., *Automatic Method for Correlating Horizons Across Faults in 3d Seismic Data*, Computer Vision and Pattern Recognition, 2004, CVPR 2004, Proceedings of the 2004 IEEE Computer Society Conference, vol. 1 (6 pgs.).

(Continued)

*Primary Examiner* — Todd Buttram
(74) *Attorney, Agent, or Firm* — Fish & Richardson P.C.

(57) ABSTRACT

A system and method for well log vectorization are described that assist geologists or other technicians to rapidly and accurately vectorize well log curves that are visually evident in a raster well log image. The resulting digital well log curves are instrumental for qualitative interpretation and quantitative analysis of geologic information measured along well bores. The system and method simplifies and makes more efficient and accurate the process of vectorizing well log curves that are displayed in a digital raster log image.

20 Claims, 12 Drawing Sheets

(56) References Cited

U.S. PATENT DOCUMENTS

| | | | |
|---|---|---|---|
| 10,077,648 | B2* | 9/2018 | Ledroz .................. E21B 47/022 |
| 2004/0015296 | A1 | 1/2004 | Causse et al. |
| 2004/0220790 | A1 | 11/2004 | Cullick et al. |
| 2004/0260476 | A1* | 12/2004 | Borgos .................. G01V 1/301 |
| | | | 702/14 |
| 2006/0052937 | A1 | 3/2006 | Zoraster et al. |
| 2006/0075007 | A1 | 4/2006 | Anderson et al. |
| 2006/0274386 | A1* | 12/2006 | Wakazono ............. H04N 9/735 |
| | | | 358/518 |
| 2007/0276604 | A1 | 11/2007 | Williams |
| 2009/0043507 | A1 | 2/2009 | Dommisse et al. |
| 2009/0125288 | A1 | 5/2009 | Main et al. |
| 2009/0157319 | A1* | 6/2009 | Mitchell ............... E21B 47/022 |
| | | | 702/9 |
| 2009/0319243 | A1 | 12/2009 | Suarez-rivera et al. |
| 2010/0125349 | A1 | 5/2010 | Abasov et al. |
| 2010/0214870 | A1 | 8/2010 | Pepper et al. |
| 2011/0002194 | A1 | 1/2011 | Imhof et al. |
| 2011/0011595 | A1 | 1/2011 | Huang et al. |
| 2011/0042098 | A1 | 2/2011 | Imhof |
| 2011/0115787 | A1 | 5/2011 | Kadlec |
| 2011/0122136 | A1* | 5/2011 | Jo .......................... G06T 17/20 |
| | | | 345/428 |
| 2011/0172976 | A1* | 7/2011 | Budiman .............. E21B 47/022 |
| | | | 703/2 |
| 2011/0181610 | A1* | 7/2011 | Baggs .................. G06T 11/001 |
| | | | 345/589 |
| 2011/0213577 | A1 | 9/2011 | Mousavi et al. |
| 2011/0313743 | A1 | 12/2011 | Oury et al. |
| 2012/0010865 | A1 | 1/2012 | Benson |
| 2012/0080197 | A1* | 4/2012 | Dickens ................ G01V 3/083 |
| | | | 166/369 |
| 2012/0253770 | A1 | 10/2012 | Stern et al. |
| 2013/0090855 | A1 | 4/2013 | Rasmus et al. |
| 2013/0169644 | A1 | 7/2013 | Bolton et al. |
| 2013/0229891 | A1* | 9/2013 | Witte ...................... G01V 1/34 |
| | | | 367/9 |
| 2013/0262052 | A1 | 10/2013 | Mallet et al. |
| 2014/0140580 | A1* | 5/2014 | Neave .................... G01V 1/301 |
| | | | 382/109 |
| 2014/0142906 | A1 | 5/2014 | Berezin et al. |
| 2014/0222347 | A1 | 8/2014 | Bashore |
| 2014/0254884 | A1 | 9/2014 | Elkington et al. |
| 2014/0262246 | A1* | 9/2014 | Li .......................... E21B 21/08 |
| | | | 166/250.08 |
| 2014/0316706 | A1 | 10/2014 | Grant et al. |
| 2015/0098627 | A1* | 4/2015 | Ye ............................ G01V 1/50 |
| | | | 382/109 |
| 2015/0198029 | A1* | 7/2015 | Chen ...................... E21B 10/43 |
| | | | 175/382 |
| 2016/0139282 | A1* | 5/2016 | Dimitrov ............... G01V 1/302 |
| | | | 703/2 |
| 2016/0237810 | A1* | 8/2016 | Beaman, Jr. ........... E21B 47/10 |
| 2017/0108614 | A1 | 4/2017 | Neave et al. |

OTHER PUBLICATIONS

Andersen, et al., *Seismic Waveform Classification: Techniques and Benefits*, dated Mar. 2004; pp. 26-29; (4 pgs.).
Aurnhammer et al., *A Genetic Algorithm for Automated Horizon Correlation Across Faults in Seismic Images*, IEEE Transactions on Evolutionary Computation, vol. 9., No. 2, Apr. 2005 (10 pgs.).
Brown et al., *Seismic Event Tracking by Global Path Optimization*, 76th Annual International Meeting, SEG, Expanded Abstracts, 1063-1067, 2006 (4 pgs).
Can, *Probabilistic Performance Forecasting for Unconventional Reservoirs with Stretched-Exponential Model*, Diss. Texas A&M University, May 2011 (74 pgs.).
Castro de Matos, et al., *Unsupervised Seismic Facies Analysis Using Wavelet Transform and Self-Organizing Maps*, dated Dec. 13, 2006; vol. 72, No. 1, pp. P9-P21, 19 Figs. (13 pgs.).
Chang et al., *NMR Characterizations of Properties of Heterogeneous Media*, Research Report, Final Report; U.S. Dept. of Energy, DOE Award No. DE-AC26-99BC15202, Texas A&M University, 2005, pp. 1-151 (151 pgs.).
Coleou, et al.; *Unsupervised Seismic Facies Classification: A Review and Comparison of Techniques and Implementation*, The Leading Edge, dated Oct. 2003; pp. 942-953; (7 pgs.).
Diersen et al., *Classification of Seismic Windows Using Artificial Neural Networks*, dated 2011; pp. 1-10 (10 pgs.).
Dijkstra; A Note on Two Problems in Connexion with Graphs, Numerische Mathematik 1, pp. 269-271, dated Jun. 11, 1959 (3 pgs.).
Forth et al., *Application of Statistical Analysis to Optimize Reservoir Performance*, Journal of Canadian Petroleum Technology, Sep. 1, 1997 (7 pgs.).
Goshtasby Image Registration Principle, Tools and Methods, 2012, XVIII, pp. 7-66 (2012).
Herrera, *Automated Seismic-to-well Ties?*, 7th EAGE Conference & Exhibition incorporating SPE EUROPEC 2012, Jun. 1, 2012 (5 pgs.).
Hintze, J.L.. *NCSS Data Analysis User's Guide III, Regression and Curve Fitting*, NCSS 2007. Retrieved from http://ncss.wpengine.netdna-cdn.com/wp-content/uploads/2012/09/NCSSUG3.pdf (653 pgs.).
Hollt, et al., *Interactive Seismic Interpretation with Piecewise Global Energy Minimization*, dated Mar. 1, 2011, pp. 59-66 (8 pgs.).
Jeong, et al.; *A Fast Iterative Method for Eikonal Equations*, SIAM J. Sci. Comput., vol. 30, No. 5, pp. 2512-2534, dated Jul. 23, 2008 (23 pgs.).
Kass et al., Snakes: Active Contour Models, International Journal of Computer Vision, 321-331, 1988 (11 pgs).
Morita et al. Extracting time-ordered pairs of similar subsequences by time warping approach, 3rd International Workshop on Mining Temporal and Sequential Data, Aug. 22, 2004 (12 Pages).
Lineman et al.: Well-to-Well Log Correlation Using Knowledge-Based Systems and Dynamic Depth Warping, dated Jan. 1, 1987 (Jan. 1, 1987); XP055327735, Retrieved From the Internet URL: https://dspace.mit.edu/bitstream/handle/1721.1/75091/1987.14Lineman et al.Pdf?sequence=1 [retrieved on Dec. 9, 2016] (34 pgs.).
Mortensen et al., Interactive Segmentation with Intelligent Scissors, Graphical Models and Image Processing, 60(5):349-384 (1998) (48 pgs).
Ouenes, Ahmed, et al., Practical Use of Neural Networks in Tight Gas Fractured Reservoirs: Application to the San Juan Basin, Paper SPE 39965 (1998) (8 pgs.).
Pages from Website: http://www.neuralog.com/pages/NeuraLog.html, printed Dec. 3, 2015 (2 pgs).
Roy, et al., Automatic Seismic Facies Classification with Kohonen Self Organizing Maps—a Tutorial, dated Dec. 2010; pp. 6-14; (9 pgs.).
Valk et al., Investigation of Key Parameters in SAGD Wellbore Design and Operation, Journal of Canadian Petroleum Technology, vol. 46, No. 6, Jun. 2007 (8 pgs.).
Welch et al. *Free Form Shape Design Using Triangulated Surfaces*, Computer Graphics, 28, Proc. SIGGRAPH '94, 1994 (preprint) (10 pgs).
Wikipedia. Wikipedia, Overfitting. Revision from Aug. 23, 2012. pp. 1-3. Retrieved from http://en.wikipedia.org/w/index.php?title=Overfitting&oldid=508784472 (3 pgs.).
Yang, *Integrated Reservoir Description from Seismic, Well Log, to Production Data*, SPE 38381 © May 18, 1997 (9 pgs.).
Zoraster et al., *Curve Alignment for Well-to-Well Log Correlation*, SPE 90471, SPE Annual Technical Conference and Exhibition, Dec. 31, 2004 (6 pgs.).
PCT/US2013/068348, PCT International Preliminary Report on Patentability dated May 5, 2015 (5 pgs.).
PCT/US2013/068348, PCT International Search Report dated Apr. 29, 2014 (3 pgs.).
PCT/US2013/068348, PCT Written Opinion of the International Searching Authority dated Apr. 29, 2014 (4 pgs.).
PCT/US2013/068349, PCT International Search Report dated Jan. 30, 2014 (3 pgs.).

(56) References Cited

OTHER PUBLICATIONS

PCT/US2013/068349, PCT Written Opinion of the International Searching Authority dated Jan. 30, 2014 (5 pgs.).
PCT/US2013/070838, PCT International Preliminary Report on Patentability dated May 26, 2015 (6 pgs.).
PCT/US2013/070838, PCT International Search Report dated Apr. 9, 2014 (3 pgs.).
PCT/US2013/070838, PCT Written Opinion of the International Searching Authority dated Apr. 9, 2014 (5 pgs.).
PCT/US2014/034546, PCT International Preliminary Report on Patentability dated Oct. 7, 2014 (9 pgs.).
PCT/US2014/034546, PCT International Search Report dated Sep. 22, 2014 (3 pgs.).
PCT/US2014/034546, PCT Written Opinion of the International Searching Authority dated Sep. 22, 2014 (8 pgs.).

\* cited by examiner

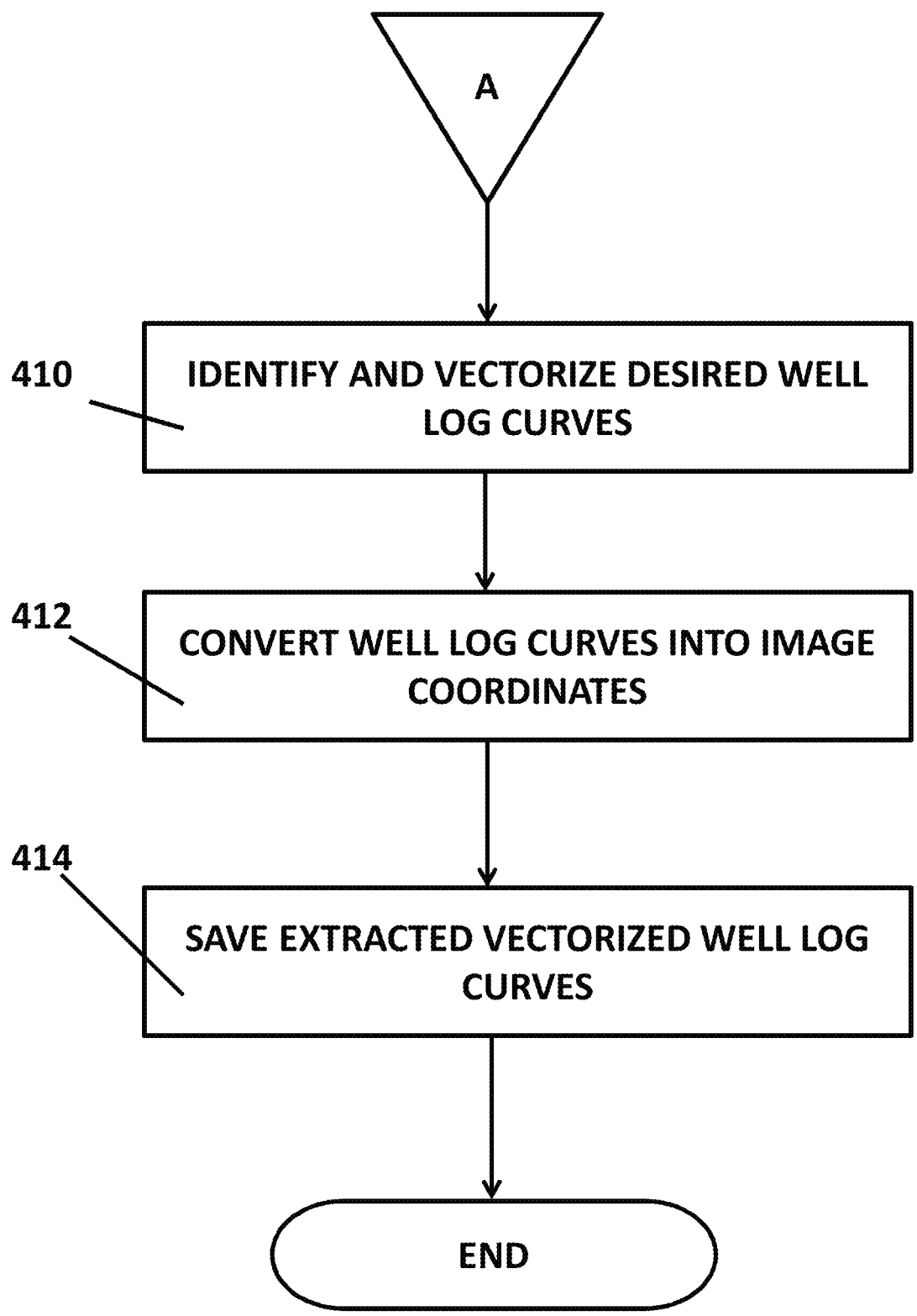

RASTER LOG DIGITIZATION SYSTEM AND METHOD

PRIORITY CLAIM

This application claims priority under 35 USC 120 and is a continuation of U.S. patent application Ser. No. 14/958,879, filed Dec. 3, 2015 and entitled "Raster Log Digitization System and Method" that in turn claims the benefit under 35 USC 119(e) and priority under 35 USC 120 to U.S. Provisional Patent Application Ser. No. 62/087,109 filed on Dec. 3, 2014 and entitled "Raster Log Digitization System and Method", the entirety of both of which are incorporated herein by reference.

FIELD

The disclosure relates to a system and process for extracting digital well log curves (measurements of physical values as functions of measured depth along a well bore) from digital raster well log images (usually scanned images of paper records of well log recordings) representing one or more well logs. This process is variously known as 'digitization' or 'vectorization'. More particularly, the disclosure relates to a computer-implemented method for extracting and vectorizing digital well log curves from such raster images.

BACKGROUND

A digital raster log image is an image of a paper well logs record in which, along with meta-information about the origin and location of the measurements, multiple curves are displayed on multiple horizontal scales, the vertical scale typically measuring depth which is a measure of distance along a well bore.

There are a large number of potentially valuable historical well log measurements that are recorded on paper or, having originally been recorded on paper, have been scanned to create digital raster images of multiple well logs in a single image. Many of these digital raster images have suffered damage either prior to or during the scanning process and the resulting images exhibit geometric skew (from paper stretching or incorrect scanning), dirt, ink blotches and other image noise that degrades or obscures the desired well log curves. It is desirable to remove or otherwise overcome much of this geometric skew and image noise prior to and as part of the vectorization process.

Well log curve vectorization is most commonly performed by means of a human being expert simply moving a computer mouse sequentially to increasing measured depths to select an ordered sequence of points along a visually evident curve. Because these curves are frequently quite detailed with significant variation from sample to sample, a large number of points along each curve must be manually selected and digitized in order to adequately represent the curve. It is desirable to be able to substantially reduce the number of manually selected points along each curve.

A commercial software product, Neuralog (http://www.neuralog.com/pages/NeuraLog.html), attempts to address the above problem. The product does so by attempting to automatically extend a selected curve to increasing measured depths by image-guided extrapolation. The user selects a point along a curve and the system extrapolates the curve to the end of the image. When the user recognizes that the extracted curve substantially deviates from the visually recognized curve, the user inserts another point and the process is repeated.

In addition, a method for extracting 'edges' in 2-D images using a shortest path algorithm exists that was described in an article by E. N. Mortensen and W. A. Barrett, "Interactive segmentation with intelligent scissors" in Graphical Models and Image Processing, 60(5):349-384 (1998). This method, variously known as "Intelligent Scissors" or "Livewire", has proven useful for image segmentation in the commercial product Photoshop. The method has not, however, been previously employed for extraction and vectorization of well log curves from digital raster log images.

BRIEF DESCRIPTION OF THE DRAWINGS

FIGS. 4A and 4B illustrate a method for well log vectorization;

DETAILED DESCRIPTION OF ONE OR MORE EMBODIMENTS

Figure 1:
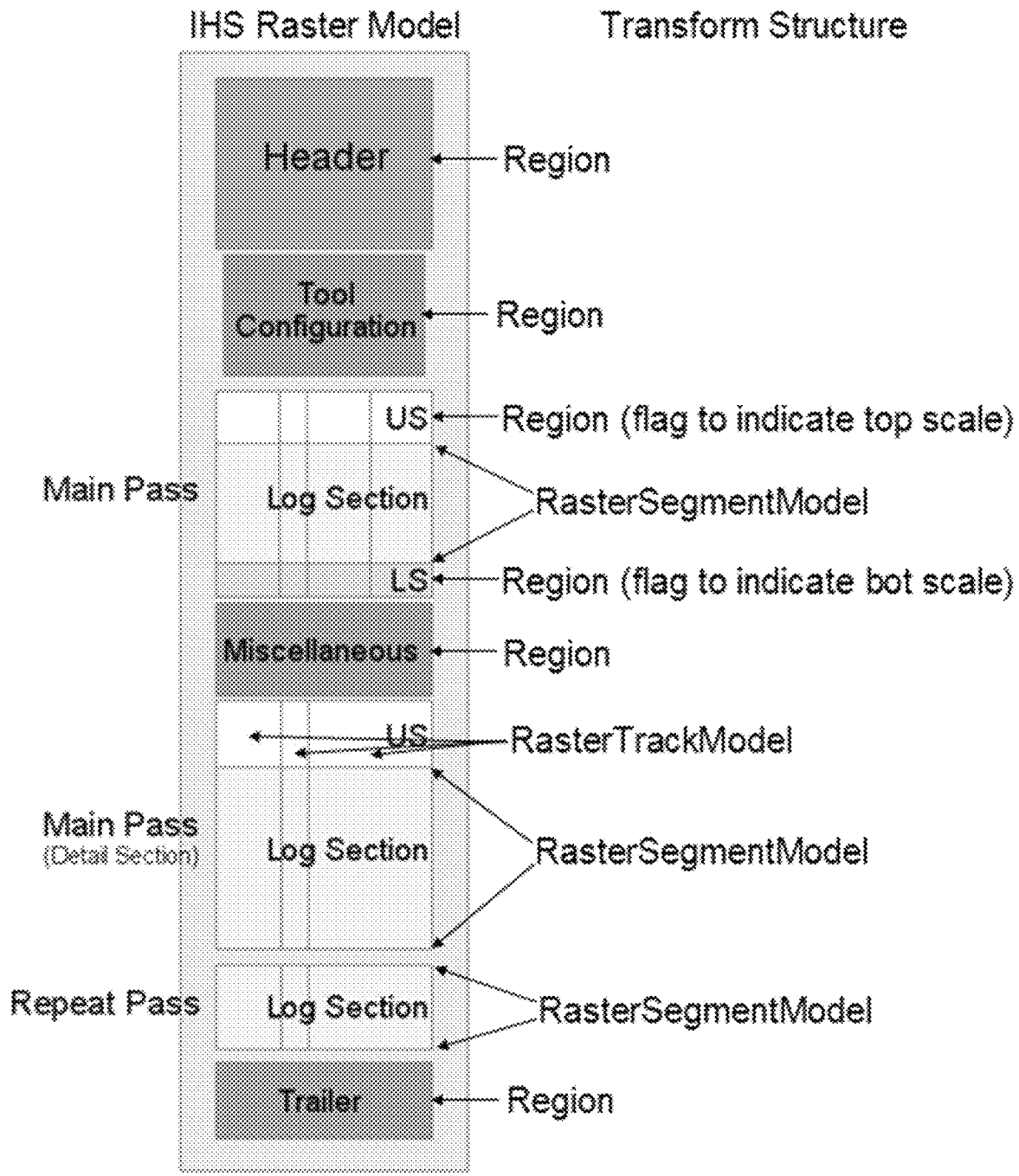
FIG. 1 illustrates a raster well log image and the nomenclature for the regions in the raster well log image.

The purpose of the vectorization system and method is to assist geologists or other technicians to rapidly and accurately vectorize well log curves that are visually evident in a raster well log image. The resulting digital well log curves are instrumental for qualitative interpretation and quantitative analysis of geologic information measured along well bores. A goal of the process is to vectorize multiple curves and produce digital curves (measurements as functions of measured depth along the well bore), one for each curve displayed in the raster image. The system and method simplifies and makes more efficient and accurate the process of vectorizing well log curves that are displayed in a digital raster log image.

Unlike the above described typical systems, the system and method being disclosed uses an automatic image-guided process to interpolate, rather than extrapolate, the curve between a pair of manually selected points, and allows for a natural mixture of manually and automatically digitized curve sections. Thus, the automated image guided process may be used to automatically digitize a curve and a manual curve section may be appended to the automatically digitized curve portion.

The method of image-guided well log vectorization significantly reduces the time required for vectorization, while increasing accuracy and reproducibility of the extracted curves. This method retains the flexibility of manual vectorization when necessary, but utilizes the raster image to greatly speed up vectorization when the image is of sufficient quality.

An advantage of the system and method is its incorporation of automatic extraction and interpolation of curves in a raster log image, using, in one embodiment, an image-guided shortest path algorithm or a modification thereof, to replace the tedious and error-prone step of manually picking control points for an interpolating curve. Using the system and method, tracing a well log curve on a raster log image typically requires the manual selection of just a few control points; the image-guided shortest path algorithm then finds an accurate image-guided path that connects the manually picked points. In contrast, a fully manual digitization of the well log curve typically requires thousands of manual picks.

A further advantage of the system and method may be that the image-guided shortest path algorithm can also be used to improve the pre-processing step of image rectification, by automatically tracing the grid lines and track edges of the raster log image. These extracted grid lines should be strictly horizontal or vertical and intersect at right angles. Detected deviations from these conditions form the basis for accurately warping the image to remove distortions due to poor scanning or damage to the original paper records. Improved image rectification results in more accurate values for the extracted digital well log curves.

The system and method may generally extract well log curves by intelligently interpolating between manually selected digitized points using an image-guided shortest paths algorithm to follow features in the raster log image. In one embodiment, the system may use various different image guided shortest paths algorithms and any of those image-guided shortest paths interpolators may be referred to as 'Logwire'. In other embodiments, the system and method may alternatively use other interpolation processes such as the image-guided shortest path, linear or some other common form of curve interpolation, thus degrading to manual vectorization when images are sufficiently noisy to preclude automatic curve extraction. In some embodiments, the system may optionally use an interpolation process to vectorize the grid and then use the digitized grid to guide a high-fidelity image rectification process.

The system and method can be operated interactively with simultaneous display of one or more images input to the system or generated by the system. For example, the system may display an original raster log image, the rectified raster log image, the raster log image with the grid lines removed, the manually selected control points and the extracted, interpolated well log curves. The curve values can in turn be converted from pixel values to physical measurement units and measured depths by reference to the curve pixel values and the digitized measurement scales.

Figure 2:
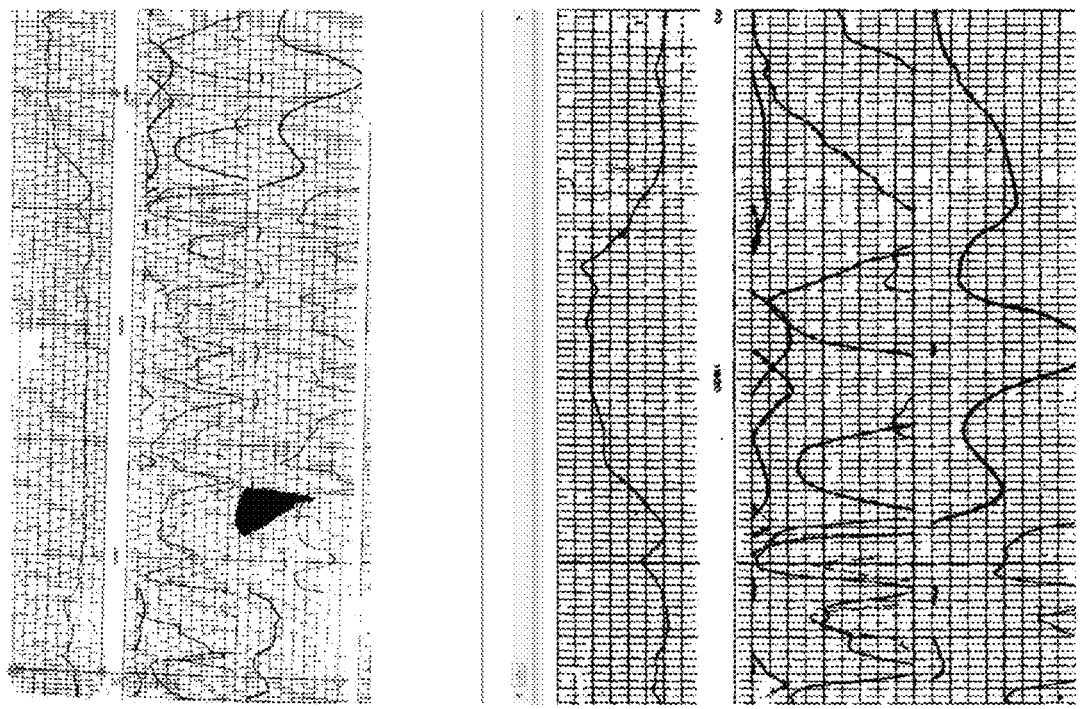
FIGS. 2 and 3 illustrate two examples of a raster well log image containing two tracks and multiple well log curves.
Figure 3:
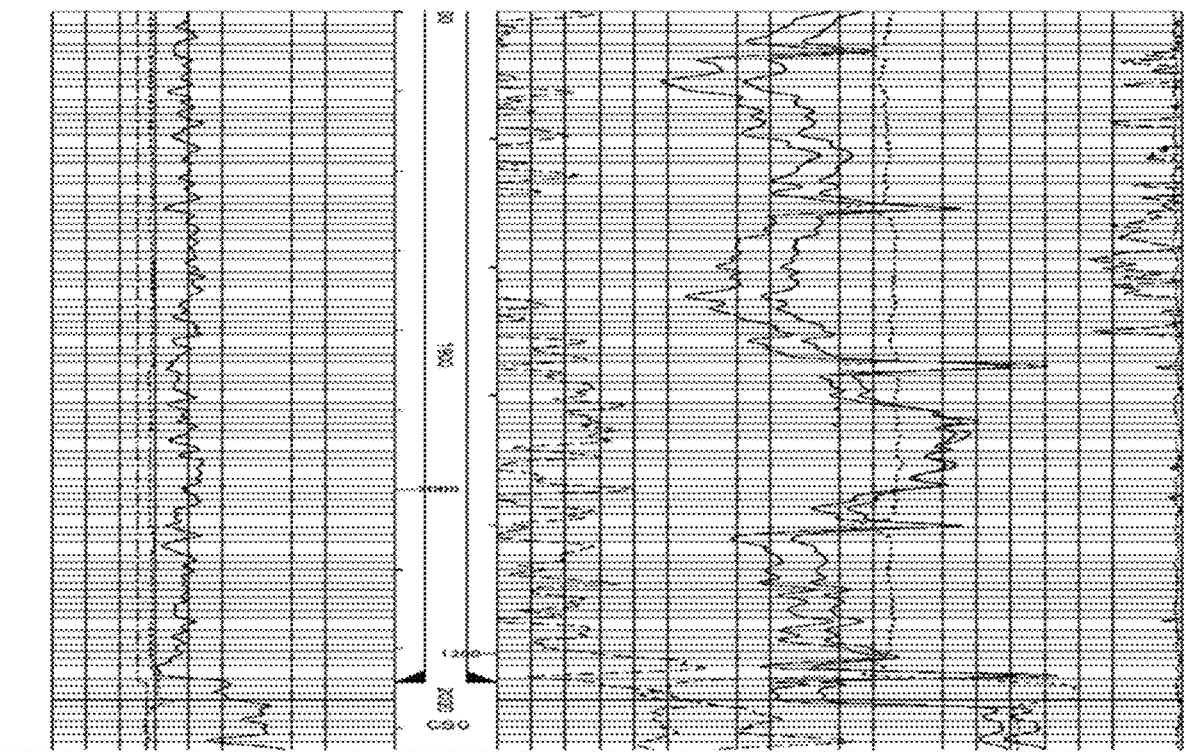

Prior to describing the digital well log vectorization process, a raster well log image and the nomenclature for the regions in the raster well log image are described with reference to FIG. 1. As shown, the raster well log image may have a Header region, a Tool Configuration region, a Miscellaneous region and a Trailer region that each contain meta-information about the well, well bore, measurement devices and location. The digital well log vectorization process described below may be used for processing of the Upper Sections (US), Lower Section (LS) and the Log Sections. The Upper and Lower Sections contain scale information for the well log measurements. The Log Section contains the raster image of the well log curves. In the other figures described below, the Log sections only are shown. For example, FIGS. 2 and 3 illustrate two examples of a raster well log image containing two tracks and multiple well log curves. A left hand side of FIG. 2 is an example of a raster well log image containing two tracks and multiple well log curves. Note that in FIG. 2, the 'horizontal' and 'vertical' grid lines are neither horizontal nor vertical, indicating rotation and possible additional horizontal skew or stretch of the image. Also note the variable image quality, including a dark splotch in the lower part of the image. The right hand side of FIG. 2 shows a portion of the image in the left hand side of FIG. 2 after well-known warping the image to rectify the grid lines. FIG. 3 shows another raster well log image with two tracks, each containing multiple curves. Note the vertical scale between the tracks. This scale is used to convert from vertical pixels to measured depth along the well bore.

Figure 4A:
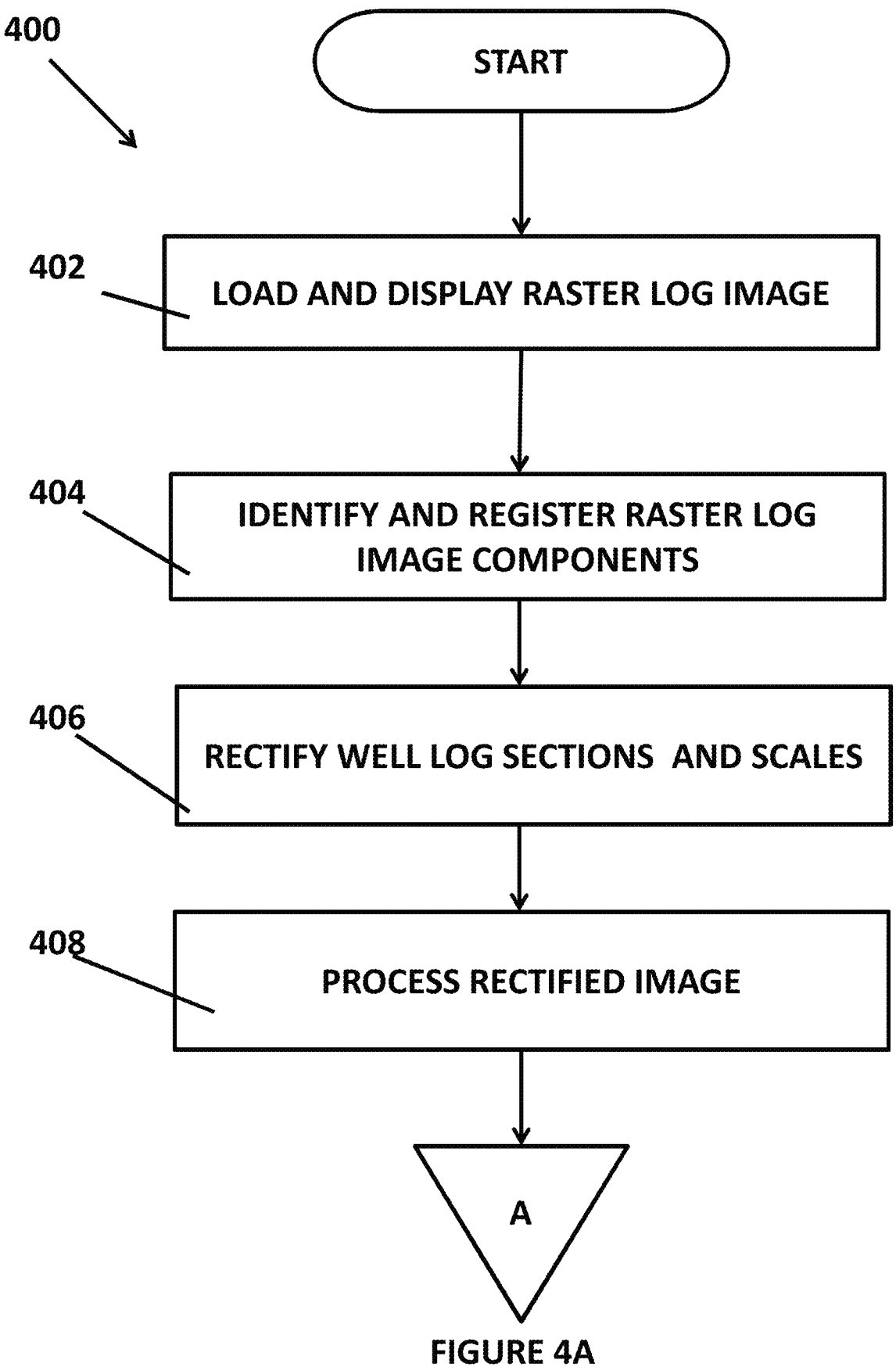

FIGS. 4A and 4B illustrate a method 400 for well log vectorization. The method may have one or more stages. Each stage may do one or more of the following processes: 1) convert to measured physical quantities by mapping from vertical pixels to measured depth and from horizontal pixels to the well log's value; 2) store in database or write to LAS file; or 3) optionally, process the image to remove extracted curve (to facilitate extraction of other curves).

Figure 5:
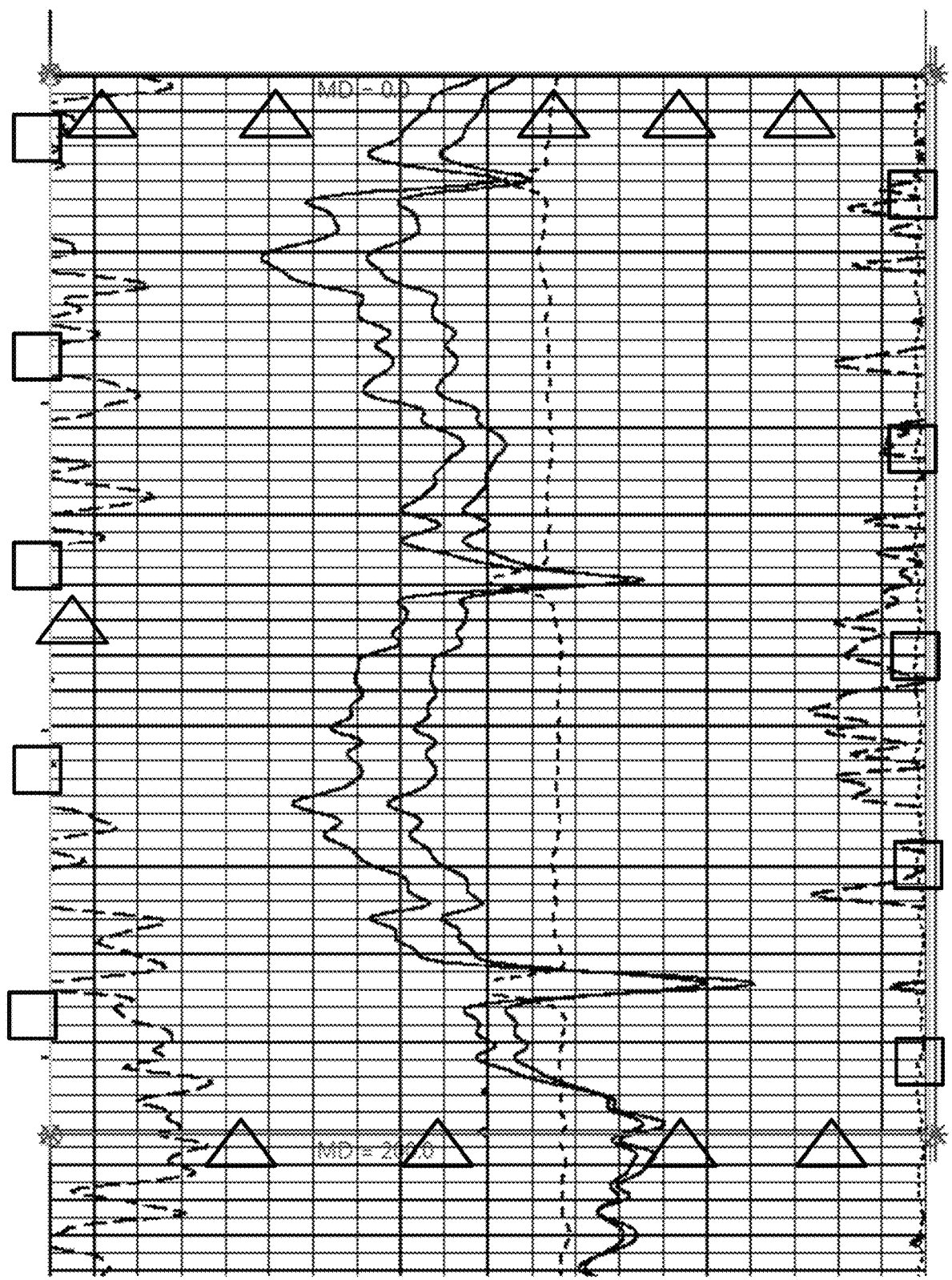
FIG. 5 is an example of a raster well log image track that has been vertically and horizontally registered.
Figure 6:
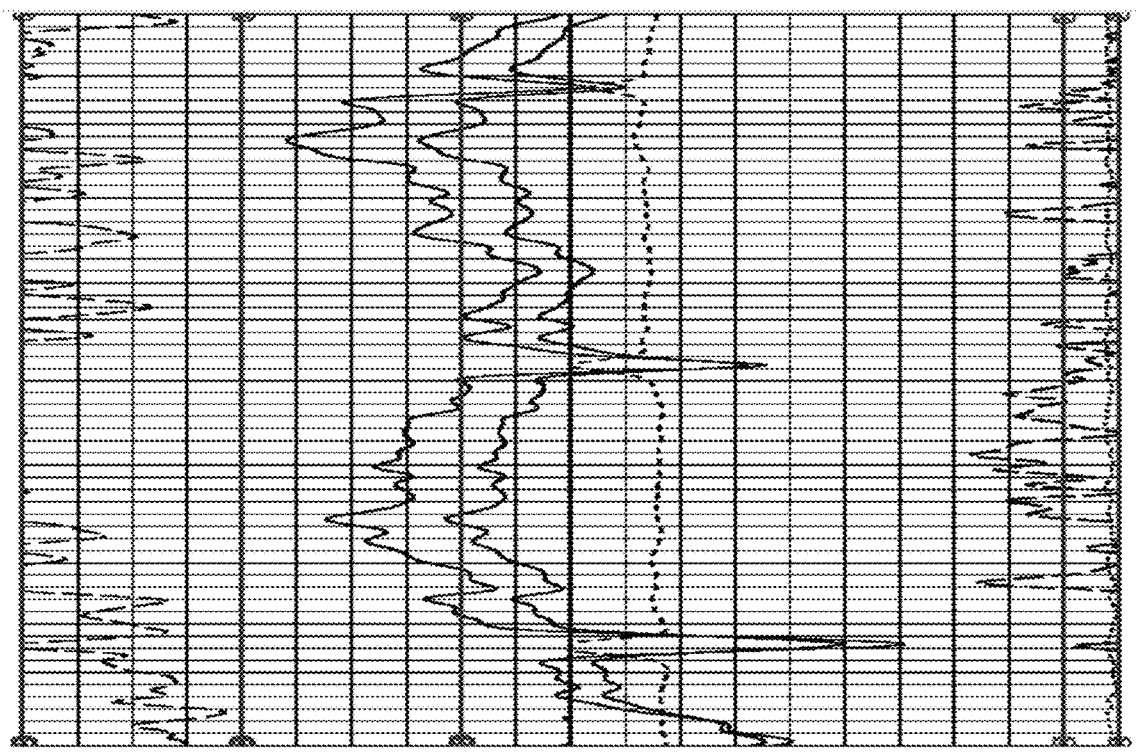
FIG. 6 is an example of a raster well log image track with multiple vertical grid lines extracted (red vertical lines)
Figure 16A:
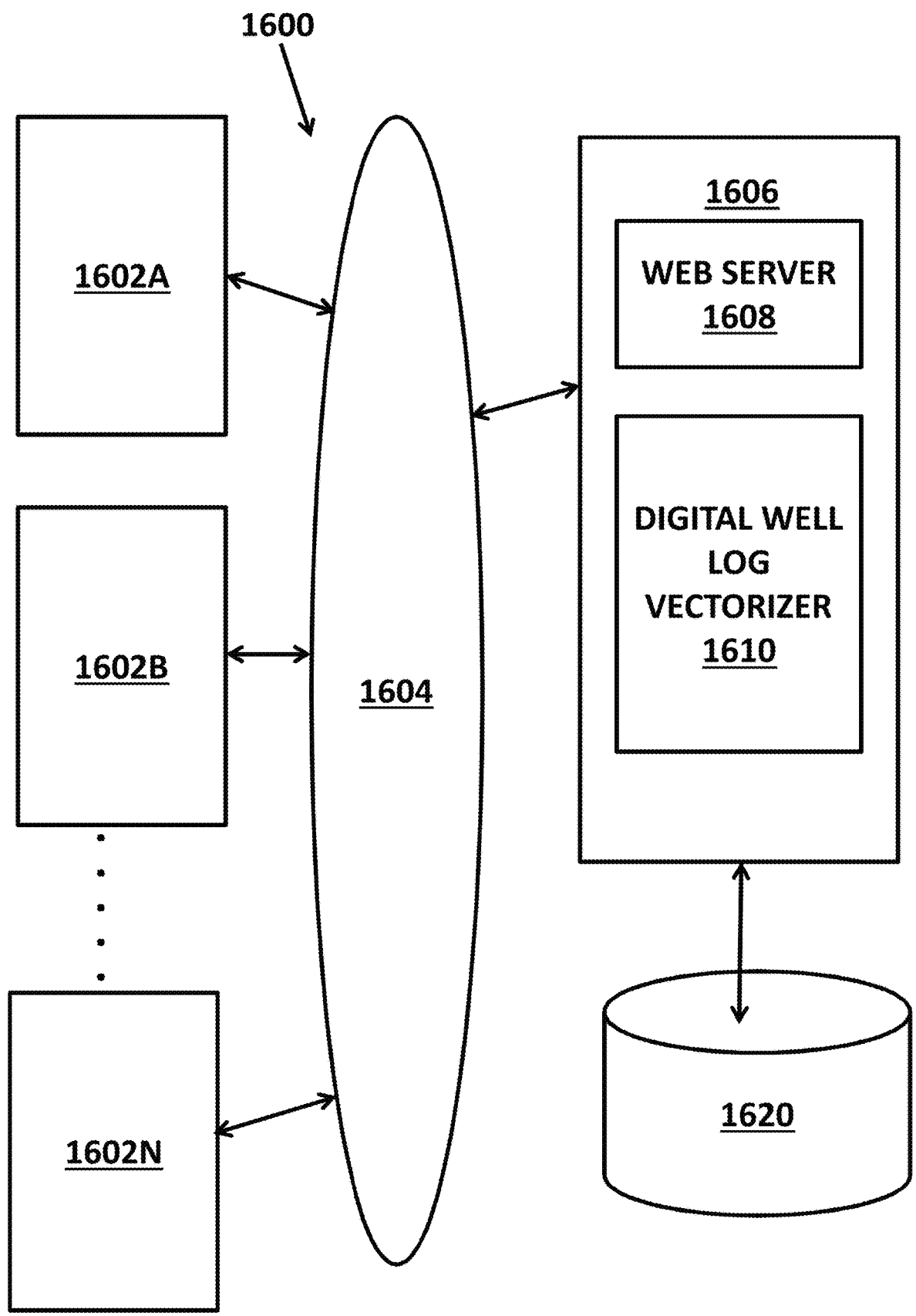
FIGS. 16A and 16B illustrate an example of two implementation of a system for well log vectorization.
Figure 16B:
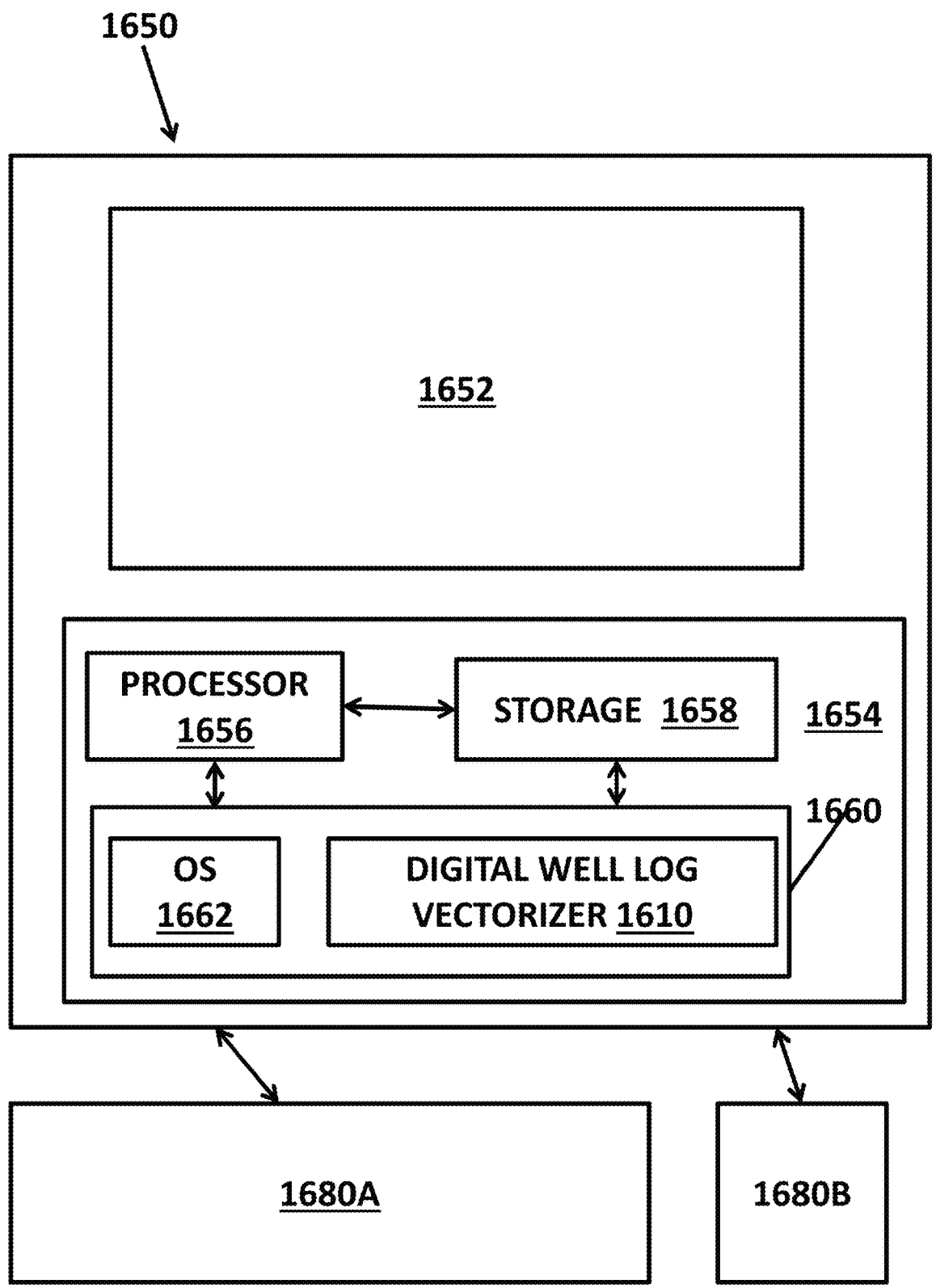

Each of the stages of the method shown in FIGS. 4A and 4B may be implemented by the system implementations shown in FIGS. 16A and 16B or by other means known to those skilled in the art. Furthermore, the processes shown in FIGS. 4A and 4B can be implemented on specialized hardware and hardware/software designed to perform the well log vectorization that is substantially more than a general computer system since the specialized hardware and hardware/software must be specially programmed or designed to be even able to perform the processes of the well log vectorization. Returning to FIGS. 4A and 4B, the method 400 may include one or more stages that are each in a processing pipeline. Although the stages are shown in a particular order in FIGS. 4A and 4B, the order of the stages may be reordered without departing from the scope of the disclosure. In a first stage, the method may load and display a raster log image (402), an example of which is shown in FIGS. 2-3. Once the raster log image is loaded into the well log vectorizer component (or the computer system), the method may perform a process of identifying and registering the raster log image components (404). For example, during this process of identifying and registering the raster log image components, the method may vertically and horizontally register the raster log image components as shown in FIGS. 5 and 6. FIG. 5 is an example of a raster well log image track that has been vertically and horizontally registered. In FIG. 5, a set of green horizontal lines (horizontal lines with periodic triangles along the line) correspond to specific measured depths (MD) of the well log such as MD=0 and MD=2000 in the example in FIG. 5. The green vertical lines (lines with squares periodically along the line) indicate the vertical edges of the track and correspond to specific measured physical values for each curve. FIG. 6 shows a raster well log image track with multiple vertical grid lines extracted (red vertical lines). Although in this image the vertical grid lines are indeed close to vertical, that is often not the case and the image can be warped to force the lines to be vertical, thus improving the image rectification prior to well log curve extraction.

Figure 7:
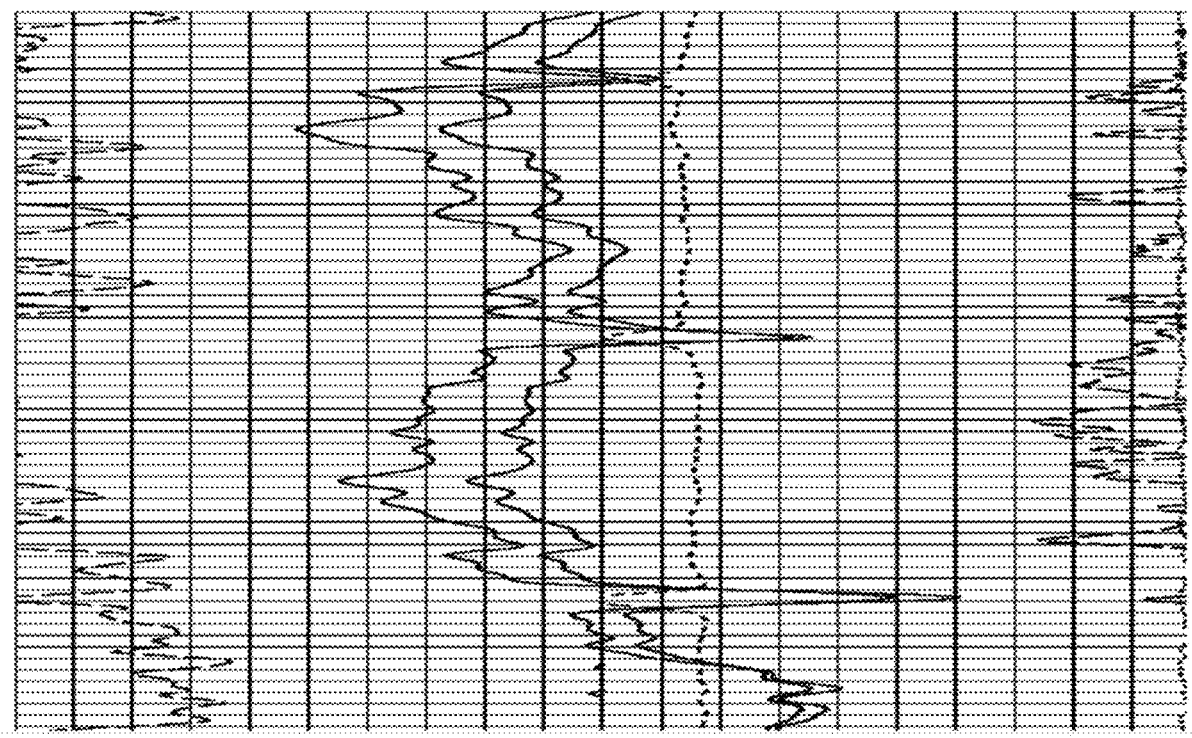
FIG. 7 shows the raster well log image track in FIG. 5 after image rectification.
Figure 8:
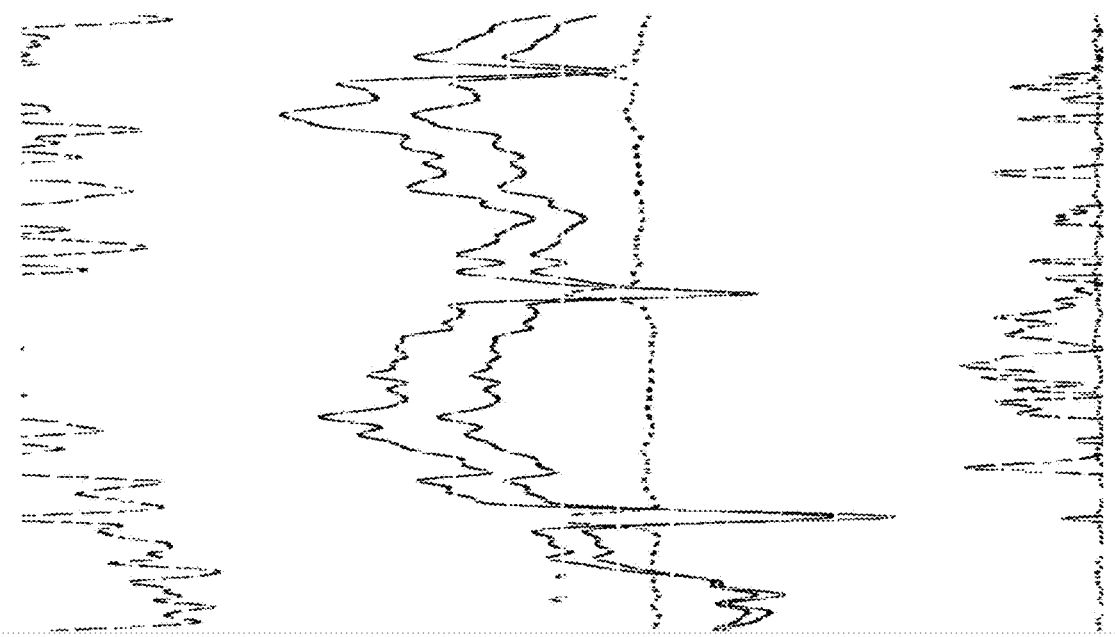
FIG. 8 shows the raster well log image track in FIG. 6 after image processing to remove the grid lines.

Once the well log image is registered, the method may perform rectification of well log sections and scales stage (406). An example of the process is shown in FIG. 7 in which the raster well log image as in FIG. 5 has been image rectified so that the grid lines are now strictly vertical and horizontal. The rectification of well log sections and scales stage may include a number of subprocesses. In particular, the stage may include: 1) selecting four corner points on the edges of each track to be rectified; 2) connecting the corner points sequentially to form a quadrilateral; 3) interpolating curves between each pair of corner points with linear line segments or by tracking the edges using a Logwire algorithm as described above; 4) adding control points along between corner points as necessary to capture irregularities in the edges of the image, interpolating between each pair of sequential points using traditional geometric curve interpolation or image-guided shortest path interpolation; 5) optionally extracting vertical and horizontal grid lines using a Logwire algorithm; and 6) performing image rectification by warping (stretch, rotate and skew) the image so that extracted 'horizontal' edges and grid lines become strictly horizontal and extracted 'vertical' edges and grid lines become strictly vertical. Once the image is rectified, the method may perform a processing of the rectified image stage (408). The processing of the rectified image may enhance the well log curves, remove noise and grid lines, and capture image information necessary to separate the curves from the background. An example of this stage is shown in FIG. 8 in which the grid lines are removed.

The processing of the image may include a number of subprocesses. In particular, the stage may include: 1) detecting and removing horizontal and vertical grid lines from the image in a known manner; 2) optionally removing isolated noise by detecting and removing connected components below some number of connected pixels; 3) optionally smoothing the image in the horizontal direction using, for example, an exponential or Gaussian smoothing function; 4) optionally extracting measures of local image orientation and structure using, for example, the eigenvalues and eigenvectors of the local gradient structure tensor at each point in the image; and 5) optionally enhancing the curves in the image by, for example, simple color separation if each curve is a different color or, for example, by performing a local Hough transform or anisotropic diffusion at each point in a binary or gray-scale image.

The method may then identify and vectorize the desired well log curves stage (410). The vectorization of the image may include a number of subprocesses for each well log curve being vectorized. In particular, the stage may include:

1. Identifying two or more digitized control points on the curve and display the control points.

2. Selecting neighboring pairs of control points and interpolate using either traditional (e.g. linear) interpolation or Logwire interpolation.

3. For those neighboring control points to be connected by Logwire interpolation, connecting the pair of control points using a raster log image-guided Logwire algorithm or similar algorithm that finds a least-cost path between two points within an image. Such path becomes the vectorized well log curve segment connecting the two control points.

a. In one implementation of the Logwire algorithm, the cost of connecting two image samples may depend on the geometric or Euclidean distance between the samples and the samples value themselves in such a manner that the more likely the samples are on a well log curve, the lower the connection cost and, conversely, the less likely the samples are on a well log curve, the higher the connection cost. If, for example, the image samples range in value from zero to one, with values closer to one more likely to correspond to a well log curve than values closer to zero, then a reasonable cost function that depends on image values may be $c=1-(p+q)/2$, where c is the connection cost, p is the image sample value at one sample and q is the image sample value at another sample.

b. Similarly, in the raster log image-guided Logwire algorithm, the connection cost between two image samples may also depend on the orientation of the path connecting the two samples such that, for example, the connection cost between two horizontally aligned samples may be less than the connection cost between two vertically aligned samples. Such orientation-dependent connection costs are said to be anisotropic.

c. Similarly, in the raster log image-guided shortest path algorithm, the connection cost may also depend on the difference in orientation between the local orientation of the image, computed for example from the gradient structure tensor, and the direction vector connecting the two samples, in such a manner that the more aligned the two orientations the lower the connection cost and, conversely, the less aligned the two orientations the higher the connection cost.

d. Similarly, in the raster log image-guided Logwire algorithm, the connection cost may also depend on the similarity of the image samples in such a manner that the greater the similarity the lower the connection cost and, conversely, the lower the similarity the higher the connection cost. Such similarity-dependent connection costs can operate on color (e.g. RGB) images as well as gray-scale and binary images and, in the former case, can effectively distinguish between well log curves of different colors.

e. Similarly, in the Logwire algorithm, the computation domain should be treated as the surface of a vertical cylinder with the vertical track edges connected on that surface. This modification of the domain allows the algorithm to track curves that wrap around the edges of the track.

4. Optionally extending the vectorized well log curve either by adding control points between or beyond existing control points.

5. Repeating steps (1)-(4) of the above process until the extracted vectorized curve sufficiently represents the curves in the raster log image.

6. Unwrapping the curves that span the vertical track edge to make them continuous functions of vertical position. Such unwrapping procedures are well-known.

7. Optionally resampling the extracted curves and refine by straightforward smoothing (e.g. Gaussian smoothing or tension splines) or by employing an image-guided technique that balances path curvature with path attraction to image features, such as the active contours algorithm.

8. Optionally removing the extracted curves from the raster log image. This step can reduce interference between curves and thus reduce the number of control points necessary to extract subsequent curves.

Figure 9:
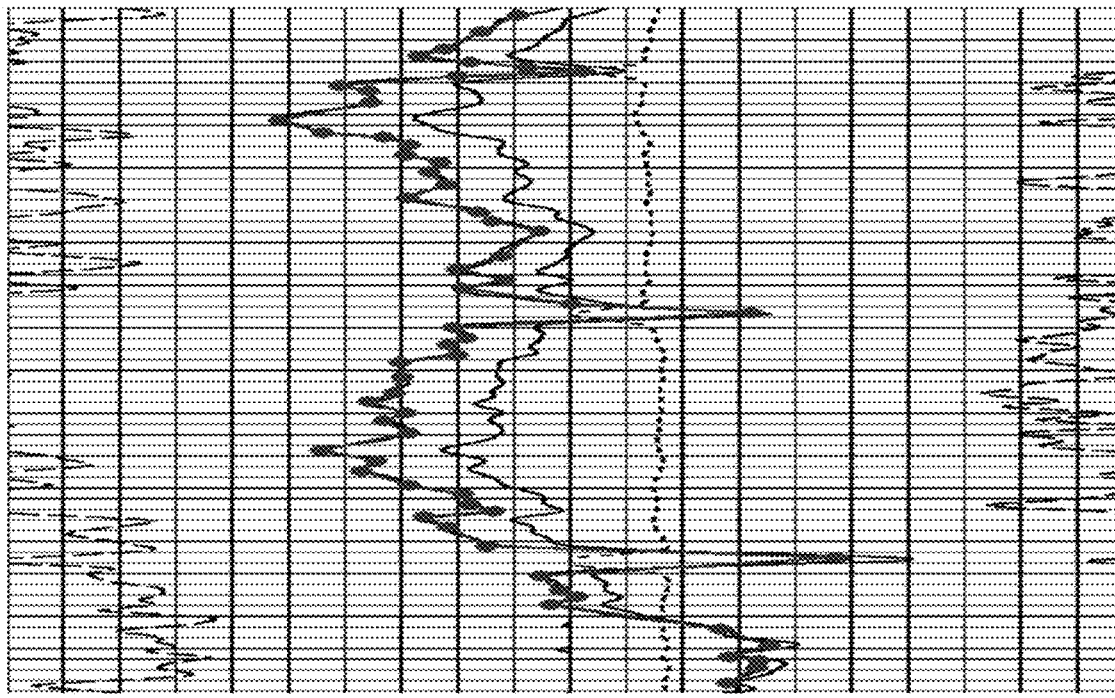
FIG. 9 illustrates the result of manually vectorizing the well log curve in FIG. 6.
Figure 10:
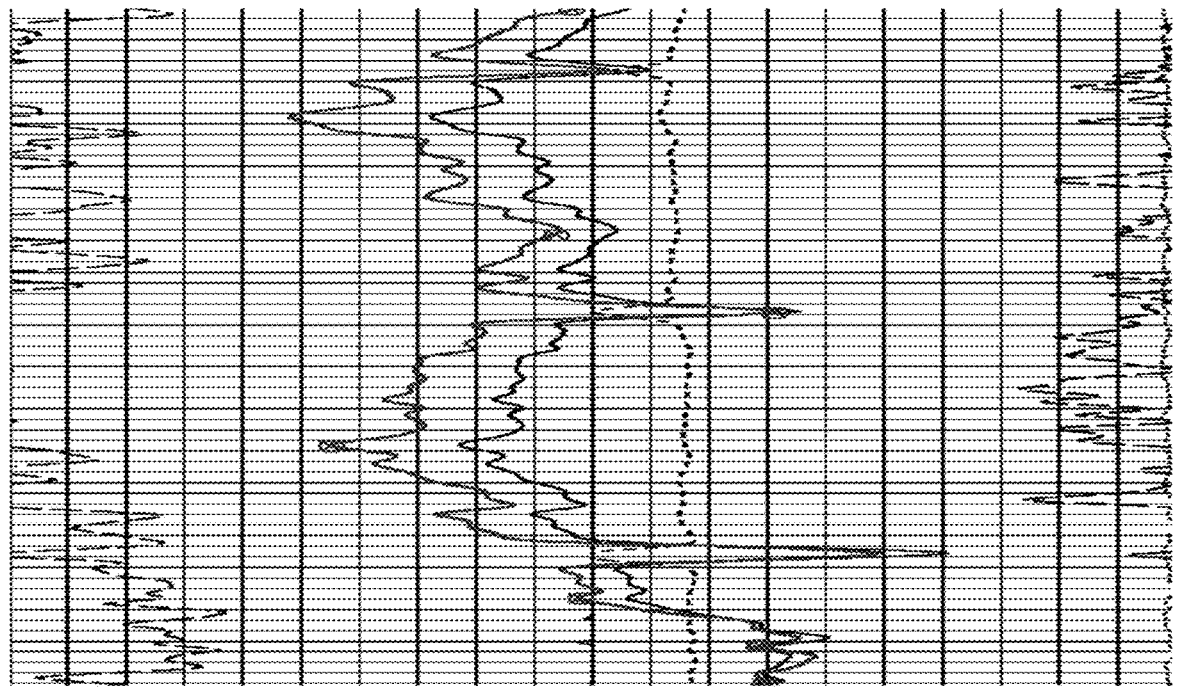
FIG. 10 illustrates a vectorized result of the well log curve in FIG. 6 using an anisotropic image-guided shortest path method to interpolate between manually picked control points.
Figure 11:
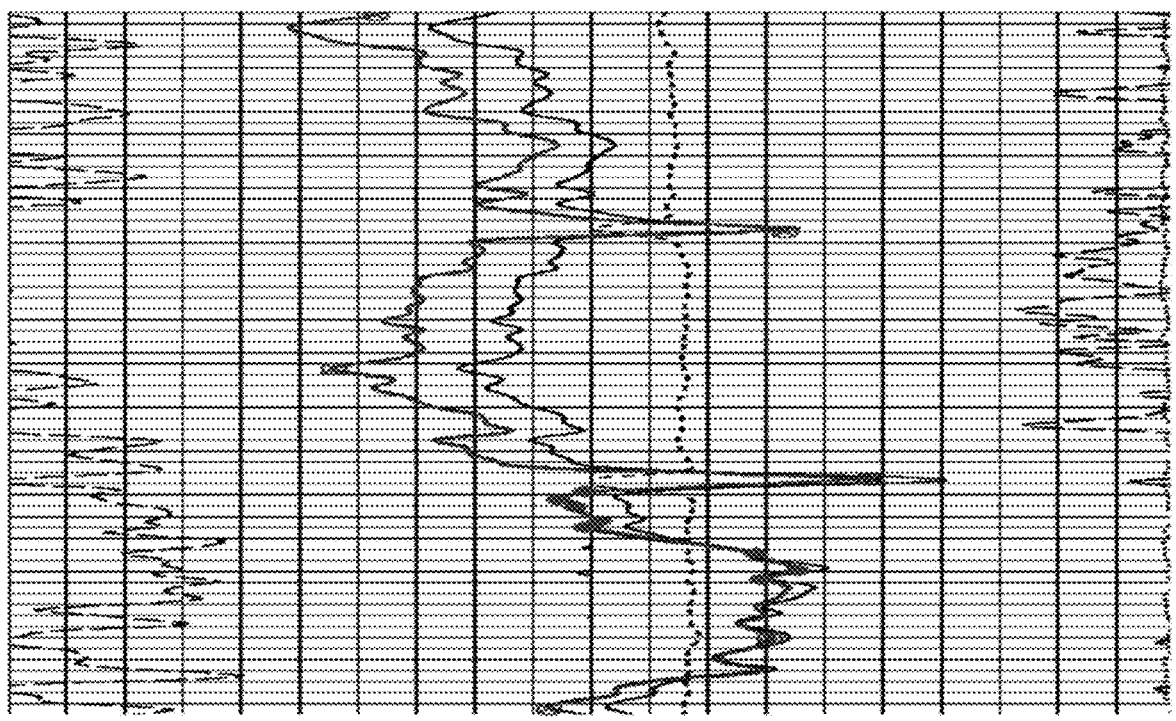
FIG. 11 illustrates a vectorized result of the well log curve in FIG. 6 using a combination of manual (linear interpolation connecting pairs of solid circles) and image-guided segments (connecting open circles)
Figure 12:
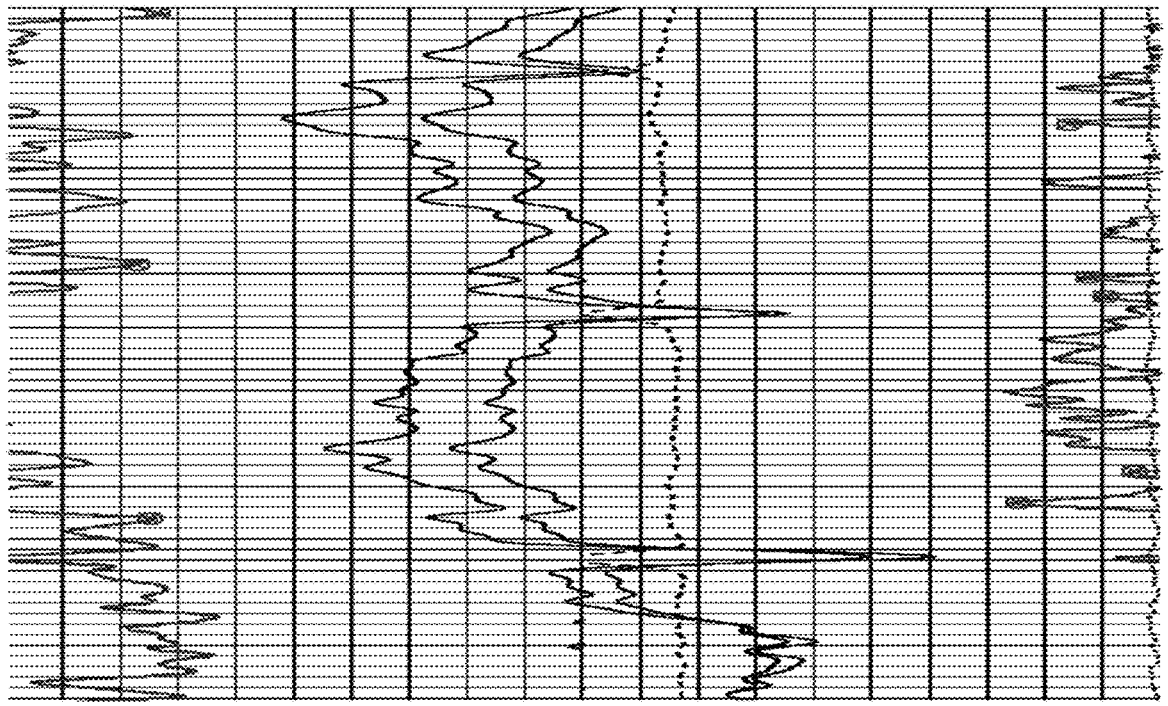
FIG. 12 illustrates a vectorized result of the well log curve in FIG. 6 using image guided shortest path extraction on a well log curve that wraps around the edges of the track.

An example of the results of this stage are shown in FIGS. 10-12 while FIG. 9 shows manual well log vectorization. Specifically, FIG. 9 shows the result of manually vectorizing a well log curve in the image of FIG. 7 and note that the manual process requires a large number of manually picked control points (dots along the curve) in order to adequately represent the underlying curve. However, as shown in FIG. 10, the same curve as in FIG. 9 is vectorized using an anisotropic image-guided shortest path algorithm to interpolate between manually picked control points. Note that many fewer manually selected points (circles along the curve) are required in order to adequately represent the underlying curve. FIG. 11 illustrates an example of the vectorized curve when a combination of manual (linear interpolation connecting pairs of solid circles) and image-guided segments (connecting open circles) are used in this stage.

There are instances when more manual selection is necessary to overcome ambiguities or noise in the image but the image-guided method will never require more control points than manual vectorization.

Figure 13:
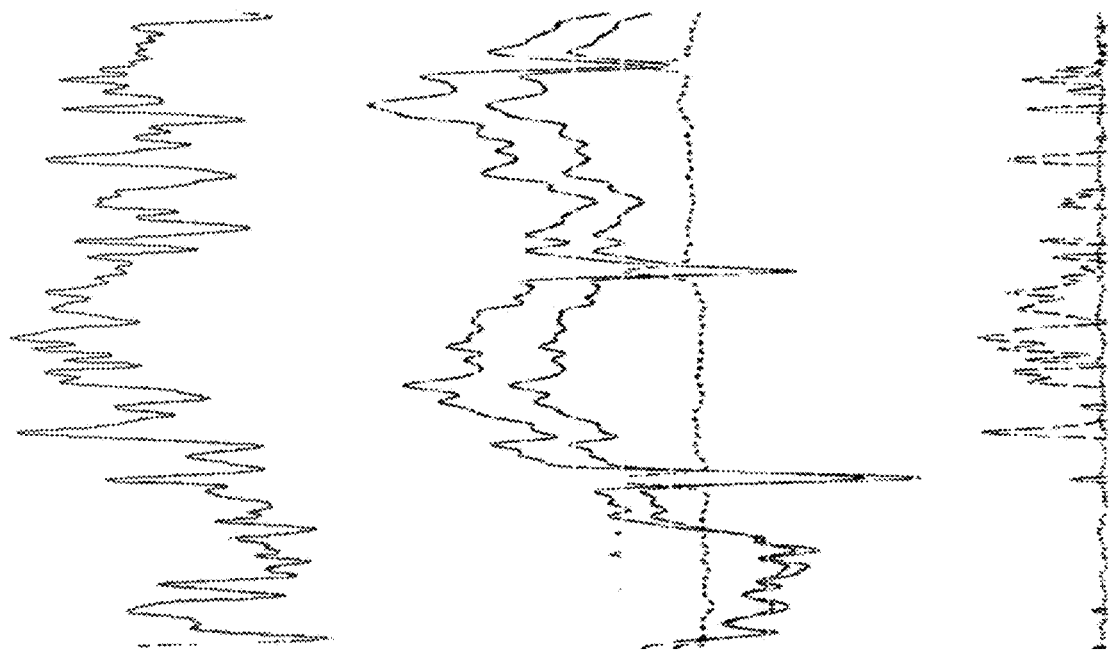
FIG. 13 illustrates the curve in FIG. 12 after unwrapping the curve.

Finally, FIG. 12 shows the result of using raster log image-guided shortest path extraction on a well log curve that wraps around the edges of the track. In this embodiment, the shortest path problem may be solved as if the vertical edges were connected after wrapping around a vertical cylinder. Subsequent to curve extraction, the curve can be 'unwrapped' to make it continuous as shown in FIG. 13, again as if the image were displayed on the surface of a vertical cylinder. This image also demonstrates that the system and method can capture dashed and dotted curves, in addition to continuous curves.

The method may then convert the well log curves into image coordinates (412). The method also may convert the well log curves from image coordinates (e.g. in pixels) to measured physical values as functions of measured depth in known manners. The method may then save the extracted vectorized well log curves in, for example, a database or file on disk (414) in a known manner.

Figure 14:
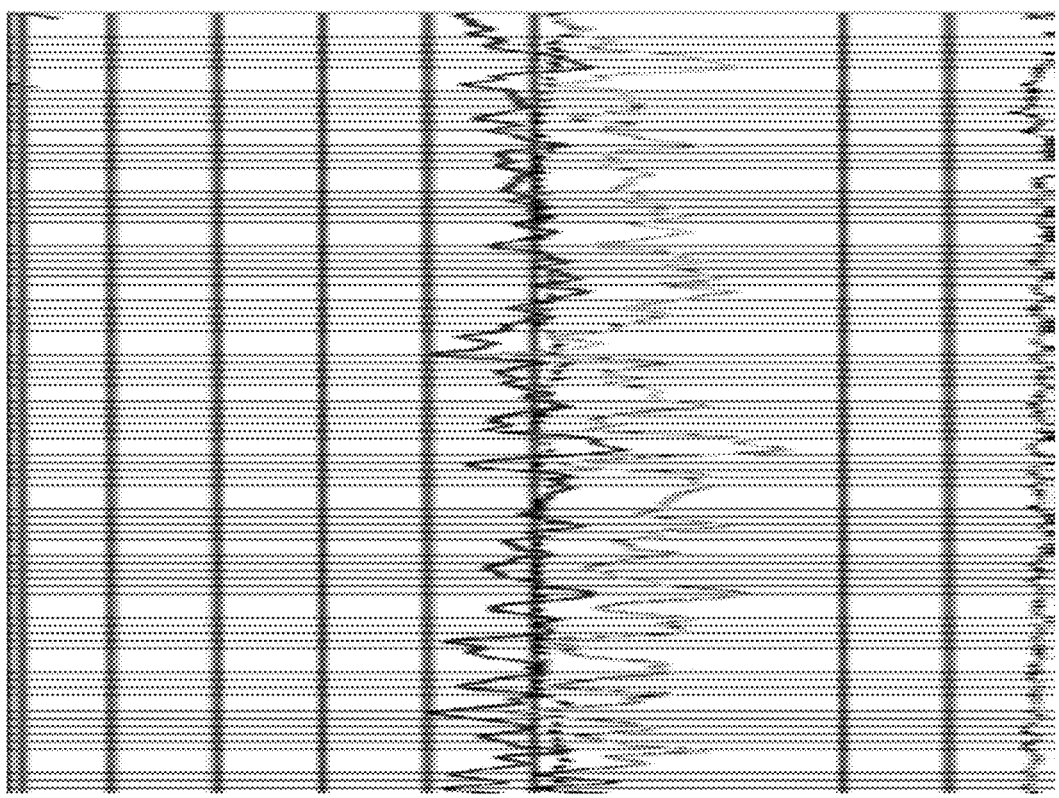
FIG. 14 illustrates multiple curves that are close to each other.

The above process can be extended to guide the user to insert additional control points to each curve by identifying curve segments with high image cost per unit length, such length being either the geometric path length or simply the Euclidean distance between the control points or some other similar measure. The user can be prompted to insert one or more additional control points between the original two, followed by automatic interpolation (image-guided or traditional) between neighboring control points, followed by re-computation of the normalized image cost along each new connecting segment. For example, as shown in FIG. 14 when multiple curves are close to one another or intersect the correct curve, the curve to extract may be ambiguous. In that case the user must provide sufficient control points to guide the algorithm to extract the desired curve, but generally all curves can be extracted.

The shortest geometric path between two points in a plane is obviously a straight line.

The raster log image-guided shortest path, as used here, refers to the minimum cost path between two points, where the cost can be a function of the image values, the image tensor, or any weighted geometry of the path or a combination of one or more of the aforementioned functions.

There are numerous implementations of image-guided shortest paths algorithms. For positive weighted paths, among most popular is Dijkstra's algorithm that is described at E. Dijkstra. "A note on two problems in connexion with graphs", Numerische Mathematik, 1(1):269-271 (1959). For fast iterative methods for solving eikonal equations, W. Jeong, R. Whitaker, "A fast iterative method for eikonal equations", SIAM J. Sci. Comput., 30(5) 2512-2534 (2007) may be used. The solution of the eikonal equation is very similar to the solution of the shortest paths problem. Furthermore, any similar algorithm may be used for this method. In addition, there are numerous well-known techniques for creating smooth or fair curves that are constrained by a collection of points and balances path curvature with attraction to image features, such as M. Kass, A. Witken, D. Terzopoulis, "Snakes: Active Contour Models", International Journal of Computer Vision, 321-331 (1988). Furthermore, any similar algorithm may be used for this method.

Figure 15:
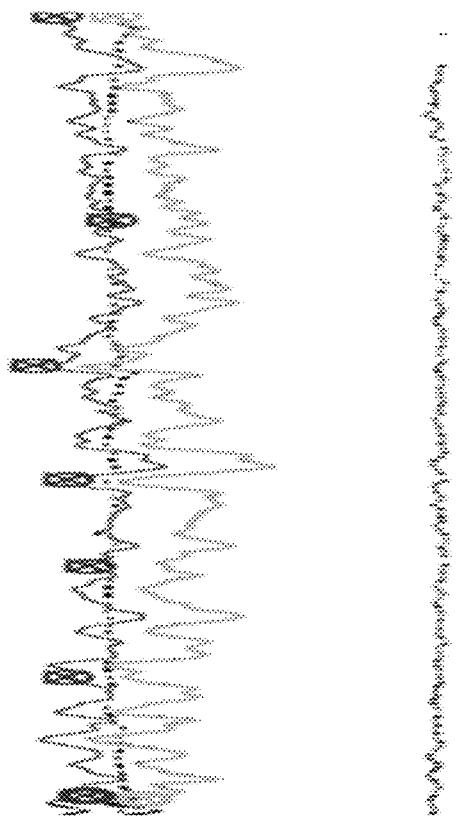
FIG. 15 illustrates the extraction of two interfering curves.

As shown in FIG. 15, if two interfering curves are extracted independently then both may need a large number of control points. If, after vectorizing the first curve (red curve on the left side in this example) the underlying image is modified to remove that curve, vectorization of the next curve (green on the right side in this example) may need many fewer control points. Control points for both curves are indicated as a circle with an X.

FIGS. 16A and 16B illustrate an example of two implementation of a system for well log vectorization that may implement the well log vectorization process described above. In particular, FIG. 16A illustrates an example of a first implementation of the system 1600 that uses a client/server or networked computer type architecture while FIG. 16B illustrates an example of a second implementation of the system 1650 that uses a standalone computer system.

The system 1600 in FIG. 16A may include one or more computing devices 1602, such as computing device 1602A, computing device 1602B, . . . , computing device 1602N. Each computing device 1602 may couple to and connect with a communications path 1604 and communicate over the communications path 1604 to a backend system 1606 to vectorize a digital well log as described below. The system 1600 may further have a store 1620, such as a software or hardware based storage system or device, that is coupled to the backend system 1606 to store the various data associated with the system including the digital well logs and the vectorized digital well logs.

Each computing device 1602 may be a device that has at least one processor, memory such as SRAM or DRAM, persistent storage such as a hard disk drive or flash, a display and circuits for coupling to/communicating over the communications path 1604. For example, each computing device 1602 may be a smartphone device such as Apple iPhone or Android OS based device, a tablet computer, a laptop computer, a personal computer, a phone device and the like.

Each computing device 1602 may store an application in the memory that is executed by the at least one processor to couple to and communicate with the backend system 1606. The application may be a browser application, a mobile application or a digital well log vectorization application. A user may use the computing device to communicate with the backend system 1606 including receiving user interfaces with results from the vectorization process, user interfaces for performing the vectorization process as described below and a way to submit data to the backend system 1606.

The communications path 1604 may be a wireless or wired communications network or a combination of wireless and wired networks. For example, the communications path 1604 may be Ethernet, the World Wide Web, a wireless data network, a wireless digital data network, a wireless cellular digital data network or a computer network. The communications path 1604 may also be a combination of one or more of the above networks. The communications path 1604 may use a known protocol, such as HTTP or HTTPS to provide communication between each computing device 1602 and the backend system 1606.

The backend system 1606 may be implemented using one or more computing resources. Each computing resource may be a server computer, a blade server computer or a cloud computing resource. The computing resources may include one or more processors, memory, persistent storage, connectivity circuits and other known elements. In the example implementation in FIG. 16A, the backend system 1606 may have a web server 1608 component since the system is a client server architecture system in which the web server 1608 manages the connections for each computing device 1602 and manages/generates the data exchange between each computing device and the backend system. The web server component 1608 may be implemented in hardware or software. The backend system 1606 also may have a digital well log vectorizer component 1610 that performs the digital well log vectorization process as described below.

The digital well log vectorizer component 1610 may each be implemented in hardware or software. In a hardware implementation, the digital well log vectorizer component 1610 may be implemented in a hardware device, a programmed hardware device, a microcontroller, a programmed logic device, a field programmable gate array (FPGAs), a graphics processing unit (GPUs) and the like.

In a software implementation, the digital well log vectorizer component 1610 may be a plurality of lines of computer code that may be stored in a memory of the computing resources and executed by a processor of the computing resources to implement the digital well log vectorizer process. Thus, the processor of the computing resources is configured to perform the processes of the digital well log vectorizer process.

The system 1650 in FIG. 16B may be a computer system that has a display 1652 and a housing 1654 and one or more input/output devices 1680, such as a keyboard 1680A and a mouse 1680B. The housing 1654 may include at least one processor 1656, persistent storage 1658 and memory 1660 that are coupled together as shown. The memory 1660 may store an operating system 1662 and the digital well log vectorizer component 1610. The computer system stores the digital well log vectorizer component 1610 and executes it using the processor 1656 as well as providing user interface to the user to interact with the digital well log vectorizer component 1610 and receive the results of the process performed by the digital well log vectorizer component 1610. The computer system 1600 shown in FIG. 16B may be a smartphone device such as Apple iPhone or Android OS based device, a tablet computer, a laptop computer, a personal computer, a phone device and the like. As above, the processor 1656 of the computing system is configured to perform the processes of the digital well log vectorizer process as described below.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general purpose computers. In implementations where the innovations reside on a server, such a server may include or involve components such as CPU, RAM, etc., such as those found in general purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the system and method, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media.

Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the abovenoted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law. While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system for digital well vectorization, comprising:
a processor, a memory, and a display;
a digital well vectorizer being executed by the processor, the digital well vectorizer that receives a digital well log from a storage device, the digital well log having one or more points on a curve that is part of the digital well log, wherein the one or more points on the curve represent measured physical values as functions of measured depth;
the digital well vectorizer having an image pre-processor that removes noise from the digital well log and separates at least one of one or more horizontal grid lines or one or more vertical grid lines from the digital well log to separate the curve from a background of the digital well log to generate a pre-processed digital well log;
the digital well vectorizer having an interpolater that interpolates the one or more points on the curve to generate a vectorized well log from the pre-processed digital well log, the vectorized well log having one or more curve sections, wherein the interpolator applies a cost function to the one or more points on the curve to generate the one or more curve sections; and the display displaying the vectorized well log having one or more curve sections to a user.

2. The system of claim 1, wherein the digital well vectorizer combines the one or more curve sections and one or more automatically digitized curve sections.

3. The system of claim 1, wherein the interpolater uses an image guided shortest path process.

4. The system of claim 3, wherein the interpolater vectorizes a grid and guides image rectification using the vectorized grid.

5. The system of claim 3, wherein the shortest path process connects the one or more points on the curve.

6. The system of claim 4, wherein the interpolater vectorizing a grid further comprises the interpolater making the grid lines vertical and horizontal.

7. The system of claim 1, wherein the image pre-processor removes noise from the digital well log by detecting and removing connected components below a particular number of connected pixels of the digital well log.

8. The system of claim 1, wherein the image pre-processor smoothes the digital well log using an exponential or Gaussian smoothing function.

9. The system of claim 1, wherein the image pre-processor enhances the curve of the digital well log through a color separation process or a local Hough transform or anisotropic diffusion.

10. The system of claim 6, wherein the interpolater making the grid lines vertical and horizontal comprises the interpolater warping the grid lines into strictly vertical and horizontal lines.

11. A method for digital well vectorization, comprising:
processing a digital well log that comprises a digital well log curve, the processing comprising removing noise from the digital well log and separating at least one of one or more horizontal grid lines or one or more vertical grid lines from the digital well log to separate the digital well log curve from a background of the digital well log to generate a processed digital well log curve;

identifying two or more control points on the processed digital well log curve, the processed digital well log curve having one or more points that represent measured physical values as functions of measured depth;

selecting a neighboring pair of control points;

interpolating using the selected neighboring pair of control points to connect the selected neighboring pair of control points to find a least-cost path between two points within an image;

applying a cost function to the selected neighboring pair of control points;

generating a vectorized curve from the two or more control points; and displaying the vectorized curve to a user.

12. The method of claim 11 further comprising extending the generated vectorized curve by adding one or more additional control points, the two or more control points having a starting location and an ending location wherein the one or more additional control points are between the starting location and the ending location.

13. The method of claim 11 further comprising extending the generated vectorized curve by adding one or more additional control points, the two or more control points having a starting location and an ending location wherein the one or more additional control points are one of before the starting location and after the ending location.

14. The method of claim 11, wherein applying the cost function comprises determining that two horizontally aligned samples is less than a connection cost between two vertically aligned samples.

15. The method of claim 11, wherein interpolating the selected neighboring pair of control points further comprises generating a vectorized well log curve segment connecting the selected neighboring pair of control points.

16. The method of claim 11, wherein interpolating the selected neighboring pair of control points further comprises using linear interpolation of the selected neighboring pair of control points.

17. The method of claim 11, wherein interpolating the selected neighboring pair of control points further comprises using logwire interpolation of the selected neighboring pair of control points.

18. The method of claim 11 further comprising displaying the selected control points.

19. The method of claim 11 further comprising unwrapping the vectorized curve to make the curve a continuous function of vertical position.

20. The method of claim 11 further comprising smoothing the generated curve.

* * * * *